United States Patent
Sagemueller et al.

(10) Patent No.: US 9,383,198 B2
(45) Date of Patent: Jul. 5, 2016

(54) METHOD AND DEVICE FOR REDUCING ERRORS IN A TURNING DEVICE DURING THE DETERMINATION OF COORDINATES OF A WORKPIECE OR DURING THE MACHINING OF A WORKPIECE

(71) Applicant: CARL ZEISS INDUSTRIELLE MESSTECHNIK GMBH, Oberkochen (DE)

(72) Inventors: Rainer Sagemueller, Aalen (DE); Dominik Seitz, Schwaebisch Gmuend (DE); Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 87 days.

(21) Appl. No.: 14/390,822

(22) PCT Filed: Mar. 22, 2013

(86) PCT No.: PCT/EP2013/056123
§ 371 (c)(1),
(2) Date: Oct. 6, 2014

(87) PCT Pub. No.: WO2013/149862
PCT Pub. Date: Oct. 10, 2013

(65) Prior Publication Data
US 2015/0052767 A1 Feb. 26, 2015

(30) Foreign Application Priority Data
Apr. 4, 2012 (DE) .......................... 10 2012 205 599

(51) Int. Cl.
*G01B 5/008* (2006.01)
*G01B 21/04* (2006.01)
(Continued)

(52) U.S. Cl.
CPC .............. *G01B 21/042* (2013.01); *B23B 25/06* (2013.01); *B23Q 17/225* (2013.01); *G01B 21/045* (2013.01); *B23B 2270/48* (2013.01)

(58) Field of Classification Search
CPC ............................ G01B 21/042; G01B 21/045
USPC ..................................................... 33/502, 503
See application file for complete search history.

(56) References Cited

U.S. PATENT DOCUMENTS

| 4,982,504 A | * | 1/1991 | Soderberg | ............ | G01B 21/045 33/502 |
| 7,918,033 B2 | * | 4/2011 | Held | .................... | G01B 21/042 33/502 |

(Continued)

FOREIGN PATENT DOCUMENTS

| DE | 19815098 A1 | 10/1999 |
| DE | 10122080 A1 | 11/2002 |

(Continued)

OTHER PUBLICATIONS

Marsh, Eric: "Precision Spindle Metrology", published by DEStech Publications, Inc., 2008, Chapter 2, ISBN 978-1-932078-77-00.

*Primary Examiner* — G. Bradley Bennett
(74) *Attorney, Agent, or Firm* — Laurence A. Greenberg; Werner H. Stemer; Ralph E. Locher

(57) ABSTRACT

A method reduces errors in a turning device during a determination of coordinates of a work piece or during machining of the work piece. The turning device allows a rotational movement of the work piece about a rotation axis of the turning device. The method includes measuring errors in the turning device on account of deviations between actual positions and actual orientations of the rotation axis, on the one hand, and corresponding ideal positions and ideal orientations of the rotation axis, on the other hand, in a range of rotation angles. Expected error values of the turning device are determined from error measurements and are used to correct the turning device.

8 Claims, 9 Drawing Sheets

(51) Int. Cl.
*B23B 25/06* (2006.01)
*B23Q 17/22* (2006.01)

(56) References Cited

U.S. PATENT DOCUMENTS

| | | | | |
|---|---|---|---|---|
| 2009/0307915 A1* | 12/2009 | Sutherland | ............ | G01B 21/042 33/502 |
| 2010/0205815 A1* | 8/2010 | Rinn | ............ | G01B 5/008 33/502 |
| 2012/0084989 A1* | 4/2012 | Pettersson | ............ | G01B 21/045 33/503 |
| 2012/0246953 A1* | 10/2012 | Engel | ............ | G01B 21/047 33/502 |
| 2014/0059872 A1* | 3/2014 | Nakagawa | ............ | G01B 21/045 33/502 |
| 2015/0061170 A1* | 3/2015 | Engel | ............ | B29C 67/0077 264/40.1 |
| 2016/0018218 A1* | 1/2016 | Nakagawa | ............ | G01B 5/008 33/503 |
| 2016/0040987 A1* | 2/2016 | Bernhardt | ............ | G01B 21/04 33/503 |

FOREIGN PATENT DOCUMENTS

| | | |
|---|---|---|
| DE | 102005023467 A1 | 11/2006 |
| JP | H05162051 A | 6/1993 |

* cited by examiner

METHOD AND DEVICE FOR REDUCING ERRORS IN A TURNING DEVICE DURING THE DETERMINATION OF COORDINATES OF A WORKPIECE OR DURING THE MACHINING OF A WORKPIECE

BRIEF SUMMARY OF THE INVENTION

Field of the Invention

The invention relates to a method for reducing errors of a turning device during the determination of coordinates of a work piece or during the machining of a work piece. The turning device allows a rotational movement of the work piece about a rotation axis of the turning device during the determination of the coordinates or during the machining of the work piece. The invention furthermore relates to an arrangement with which the method can be carried out. It is assumed that the errors of the turning device are at least partly reproducible.

It is known to rotatably mount work pieces for the purpose of measuring their coordinates or for the purpose of machining the work piece. In the field of coordinate measurement technology, for example, work pieces are arranged on rotatable tables (so-called turntables). In this way, the work piece can be brought into different working orientations in which the coordinate measuring apparatus operates, i.e. measures coordinates of the work piece. In particular, the coordinates of the work piece may be measured continuously (for example by scanning) while the turning device rotates the work piece about its rotation axis.

Corresponding considerations apply for the machining of a work piece by a machine tool. The work piece can be brought into different working orientations in order to machine the work piece. In particular, the work piece may be rotated continuously while it is being machined.

The working orientation may, in particular, be defined by a direction which extends perpendicularly to the rotation axis and through a point on the surface of the work piece, at which the work piece is scanned, or at which the work piece is machined. The force acting on the work piece during tactile sampling of the work piece with a probe or during machining of the work piece can therefore act in particular perpendicularly to the rotation axis in the direction of the working orientation.

In the field of coordinate measurement technology, for checking the shape of a work piece, it is often advantageous to scan the work piece with a probe which has an almost constant working orientation and working position relative to the turning device while the turning device rotates the work piece. The working position and working orientation are not entirely constant, since the work piece is generally not arranged exactly rotationally symmetrically with respect to the rotation axis of the turning device and/or is not, or not exactly, shaped rotationally symmetrically. For example, a probe of a coordinate measuring apparatus, which samples the surface of the work piece in a tactile fashion, may be held by the coordinate measuring apparatus in a fixed position and with a fixed orientation, the probe being deflected to a different extent relative to a holder of the probe, depending on the work piece shape to be measured. Owing to the almost constant working orientation and working position, errors of the coordinate measurement due to position-dependent and orientation-dependent errors of the coordinate measuring apparatus can be minimized. The errors of the turning device in this case crucially determine the measurement result. The speed of the measurement of the work piece can thereby be increased in many cases.

In order to reduce the errors of the turning device, the turning device may be designed in such a way that the error fulfils specifications. In particular, it is possible to use air bearings for mounting the rotationally mobile parts of the turning device, and in the case of motor-driven turning devices it is possible to use direct drives. The smaller the error of the turning device is intended to be, the higher is the design outlay.

As an alternative or in addition, errors of the turning device may be measured with a coordinate measuring apparatus, a calibration body or an arrangement of calibration bodies being arranged on the rotatable part of the turning device (for example placed on the turntable) and measured. Measurement of the errors of the turning device with respect to all six possible degrees of freedom of the movement is, however, time-consuming. If a high accuracy is required, the calibration needs to be repeated, for example when the turning device is subjected to temperature variations. Corresponding considerations apply for a turning device which is configured in order to hold work pieces rotatably in the machining range of a machine tool. The outlay for calibration is then usually even greater compared with coordinate measurement technology, since in the field of coordinate measurement technology the coordinate measurement apparatus which subsequently carries out the measurement of work pieces can mostly also be used for the calibration.

Eric Marsh describes in "Precision Spindle Metrology", ISBN 978-1-932078-77-0, in particular Chapter 2, concepts for the description of movement errors of a precision spindle.

BRIEF SUMMARY OF THE INVENTION

It is an object of the present invention to provide a method for reducing errors in a turning device during the determination of coordinates of a work piece or during the machining of a work piece, which requires little metrological and design outlay in order to keep the errors of the turning device low. In particular, the procedures already described above for measuring a work piece or machining a work piece are intended to be possible with low outlay. It is furthermore an object of the present invention to provide an arrangement for carrying out the method.

The invention is based on the discovery that turning devices for coordinate measuring apparatuses and machine tools in many cases have various error sources, which lead to various error contributions to the overall error of the turning device. In particular, these various error contributions are translational errors, i.e. the rotation axis moves in a straight-line direction during the rotational movement, and rotational errors, i.e. the rotation axis is differently inclined relative to the ideal invariant rotation axis and/or extends differently askew relative to the ideal rotation axis, depending on the rotational position of the parts of the turning device that can be moved in rotation relative to one another. The various error contributions compensate for one another or reinforce one another, depending on the working position and working orientation of the coordinate measuring instrument or of the processing tool of the machine tool relative to the turning device.

The invention is furthermore based on the discovery that, in particular working positions and working orientations, individual error sources do not have an effect, or have a lesser effect than in other working orientations and working positions, on the errors of the measurement or machining of the work piece. For example, the actual rotation axis of the turning device may tilt about a coordinate axis which extends perpendicularly to the ideal rotation axis. In this case, the tilt angle (the angle between the real and ideal rotation axes) of the turning device may vary during a rotational movement. During measurement or machining of a work piece, in a working orientation which extends in the direction of the aforementioned coordinate axis, the position of a work piece rotated by the turning device does not change because of this error source. Conversely, however, the position of the work piece does change because of this error source (i.e. because of the tilting movement) in directions which extend perpendicularly to the ideal rotation axis and perpendicularly to the aforementioned coordinate axis and do not intersect the coordinate axis. The error of this error source has a greater or lesser effect, depending on the axial distance from the center of the tilting movement (the axial distance is determined in the direction of the ideal rotation axis).

One contribution to the solution of the aforementioned object consists in determining at least one working position and/or working orientation of the coordinate measuring instrument or of the processing tool, for which the expected error of the turning device is low and/or fulfils a predetermined condition. The particular condition requires, for example, that the error of the turning device does not reach or exceed a particular error value. In particular, it is possible to determine at least one working position and/or working orientation for which the error of the turning device is less than for other working positions and/or working orientations.

During the determination of the at least one working position and/or working orientation, a predetermined measurement task for determining coordinates of the work piece, or a predetermined machining task for machining the work piece, may in particular be taken into account. For example, the task may establish the working direction of the coordinate measuring instrument or of the processing tool, or it may establish a possible or permissible range for the working orientation. The same may apply for the working position. With respect to the working orientation, two working orientations are regarded as identical in particular when they extend parallel to one another, i.e. they can be brought congruent with one another by parallel displacement. In particular, the working position may be defined as an axial working position, i.e. the working position is specified as a coordinate value of a coordinate axis (for example referred to as the z axis), which coincides with the ideal rotation axis. In this case, in particular, the working orientation may always be defined as extending perpendicularly to the ideal rotation axis when, for example, forces during the scanning of a work piece or machining of a work piece are exerted perpendicularly to the ideal rotation axis.

In a processing tool, for example, operation may be carried out only in a particular working orientation on the machine tool. Correspondingly, the mobility of a tactile or optical probe of a coordinate measuring apparatus, with which a work piece is intended to be measured, may, for example for reasons of reducing the measurement error, be restricted to such an extent that only one working orientation or a small range of different working orientations is possible. Depending on the work piece to be measured or machined, as an alternative or in addition it may merely be possible to arrange the coordinate measuring instrument or the processing tool in a particular working position or in a particular range of working positions relative to the turning device. For example, in the case of a very long work piece, the end of which is intended to be measured and which is to be oriented in the axial direction of the rotation axis of the turning device, the end of the work piece may for example be arranged either very close to a holder of the turning device or very far away from this holder.

It should therefore again be emphasized that both the working position and the working orientation are in relation to the turning device and not the work piece. With respect to the errors of the turning device, that which is important is usually exclusively or predominantly this working position and/or this working orientation with respect to the turning device. Furthermore, there may be yet other influences on the error of the turning device, for example the weight of the work piece, the moment of inertia of the work piece, the force which the coordinate measuring instrument or the processing tool exerts on the work piece, other parameters of the measurement/machining of the work piece (for example cutting depth of the tool) and/or the rotational speed with which the turning device rotates the work piece. In one configuration of the present invention, at least one of these additional influencing factors and/or any desired combination of these influencing factors may be included in the determination of the error of the turning device for the respective working orientation and/or working position. For example, a measurement of the error of the turning device may be carried out while the respective influencing factor or the respective combination of influencing factors acts.

In many cases, the translational error of turning devices contributes less to the overall error of the turning device then the rotational error which is attributable to tilting of the actual rotation axis relative to the ideal rotation axis. As mentioned above, the tilt angle may vary depending on the rotational position of the turning device. Error contributions due to a constant tilt angle not varying with the rotational movement can be determined in a straightforward way and, for example, corrected by modifying the orientation of the ideal rotation axis in such a way that it coincides with the tilted rotation axis.

The determination of the working positions and working orientations which are favorable with respect to the error of the turning device not only has the advantage of reduced errors but, as will be described below, can also be determined with particularly low measurement outlay. Since coordinates of work pieces can be measured, or work pieces can be machined, with reduced error, the design outlay for the turning devices can also be reduced.

Preferably, the error of the turning device is not measured for all possible working positions and/or working orientations of the coordinate measuring instrument or the processing tool and/or preferably the error of the turning device is not measured for all working position(s) and/or working orientation(s) which occur/s for a predetermined measurement task or a predetermined machining task. Rather, it is preferable for the error of the turning device to be measured merely for some rotational positions of the turning device and merely for a few, for example two, axial (relative to the rotation axis of the turning device) measurement positions. As an alternative, the error of the turning device may for example be measured continuously or quasi-continuously at at least one axial position of the rotation axis during a rotational movement of the rotatable part of the turning device. This may, for example, be done using capacitive or optical measurement sensors, which measure the position or the relative position of a test body (also referred to as a calibration body) rotating together with the rotatable part of the turning device. Preferably, the error of the rotation axis is in each case measured so that all error sources or substantially all error sources are taken into account. An error source is substantial when it makes or can make a substantial contribution to the overall error of the turning device.

For example, translational errors of a turning device at the axial position of a rotational bearing may be neglected if the rotational bearing does not allow any translational deviations transversely to the rotation axis at this axial position. The measuring arrangement is therefore to be designed, and the measurement is correspondingly to be carried out, in such a way that errors in relation to all relevant degrees of freedom of movement of the real rotation axis relative to the ideal rotation axis are recorded. Exemplary embodiments of the measuring arrangement will be discussed in more detail. For example, a calibration body for carrying out the measurement may be arranged on the rotatable part of the turning device, the calibration body having at at least two different axial positions a measurement body which is rotationally symmetrical with respect to the real rotation axis, and, in various rotational positions of the rotatable part of the turning device, respectively at the axial positions of the measurement bodies, the radial position of the latter being measured in two different mutually intersecting directions. In this way, the radial positions, dependent on the rotational position, can be measured directly at the axial measurement positions, and the tilt of the real rotation axis relative to the ideal rotation axis can also be determined therefrom, for example respectively for the individual rotational positions. Instead of a single calibration body, it is also possible to use an arrangement of a plurality of calibration bodies. Instead of the calibration body described above, it is for example also possible to use another calibration body, for example a multiplicity of calibration balls which are arranged next to one another approximately at the same axial position of the rotation axis and are connected to one another, for example in the form of a so-called ball plate. With measurement methods which are already known per se, the positions of the ball centers of the balls in space (i.e. their three-dimensional coordinates) can be measured, and specifically for different rotational positions of the turning device.

Measured errors of the turning device are obtained by the measurements. From these measured errors, it is then possible to determine expected errors of the turning device, which are respectively expected for a working position and working orientation of a coordinate measuring instrument or a processing tool of a machine tool. In this case, in particular, interpolation and/or extrapolation may be carried out between measured error values. Furthermore, interpolation and/or extrapolation may be carried out between already determined expected error values. As a result, for example, the expected error of the turning device is respectively obtained for a range of possible working positions and/or for a range of possible working orientations of the coordinate measuring instrument or of the processing tool. From the expected error, which may be equal to the measured error at the measurement points of the error measurement, at least one working position and/or working orientation can then be determined, in particular as already described above in general for the error of the turning device.

In particular, the following is proposed: A method for reducing errors in a turning device during the determination of coordinates of a work piece or during the machining of a work piece, wherein the turning device allows a rotational movement of the work piece about a rotation axis of the turning device during the determination of the coordinates or during the machining of the work piece, and wherein the method comprises the following steps:

errors of the turning device due to differences between actual positions and actual orientations of the rotation axis, on the one hand, and corresponding ideal positions and ideal orientations of the rotation axis, on the other hand, are measured in a range of rotation angles, i.e. in different rotational positions of two parts of the turning device that can be moved in rotation relative to one another about the rotation axis, and corresponding error measurement values are obtained, expected error values of the turning device, which are respectively expected for a relative working position and working orientation of a coordinate measuring instrument for determining the coordinates of the work piece or of a processing tool of a machine tool for machining the work piece on the one hand, and the turning device on the other hand, are determined from the error measurement values, at least one working position and/or working orientation of the coordinate measuring instrument or of the processing tool, for which the expected error value of the turning device, with a predetermined measurement task for determining coordinates of the work piece or a predetermined machining task for machining the work piece is less than for other working positions and/or working orientations and/or satisfies a predetermined condition is determined from the expected error values of the turning device.

Furthermore proposed is: An arrangement for reducing errors in a turning device during the determination of coordinates of a work piece or during the machining of a work piece, wherein the turning device allows a rotational movement of the work piece about a rotation axis of the turning device during the determination of the coordinates or during the machining of the work piece, and wherein the arrangement comprises the following:

a measuring arrangement, which is configured in order to measure errors of the turning device due to differences between actual positions and actual orientations of the rotation axis, on the one hand, and corresponding ideal positions and ideal orientations of the rotation axis, on the other hand, in a range of rotation angles, i.e. in different rotational positions of two parts of the turning device that can be moved in rotation relative to one another about the rotation axis, and to output corresponding error measurement values to a prognosis instrument, the prognosis instrument, which is configured in order to determine expected error values of the turning device, which are respectively expected for a relative working position and working orientation of a coordinate measuring instrument for determining the coordinates of the work piece or of a processing tool of a machine tool for machining the work piece on the one hand, and the turning device on the other hand, from the error measurement values, a determination instrument, which is configured in order to determine from the expected error values of the turning device at least one working position and/or working orientation of the coordinate measuring instrument or of the processing tool, for which the expected error value of the turning device, with a predetermined measurement task for determining coordinates of the work piece or a predetermined machining task for machining the work piece is less than for other working positions and/or working orientations and/or satisfies a predetermined condition.

In particular, various errors of the turning device, separated according to error sources and/or separated according to degrees of freedom of the movement of the real rotation axis relative to the ideal rotation axis, may be measured and/or determined. Various error sources are, for example, tilts of the real rotation axis in different directions and displacements of the real rotation axis in different directions. Various degrees of freedom of the movement of the real rotation axis relative to the ideal rotation axis are, for example, translational degrees of freedom transversely to the real or ideal rotation axis and in the direction of the real or ideal rotation axis. From the various errors, for example, information about favorable working positions and/or working orientations can be obtained directly. It is, however, also possible to evaluate the expected overall error of the turning device, for example at particular working positions and/or working orientations or in working position ranges and/or working orientation ranges.

In particular, it is also possible to take into account knowledge about the expected shape of the work piece, the coordinates of which are intended to be measured, during the evaluation of the expected error values and, in particular, the expected overall error. For example, the work piece may have been produced in a known production method which leads deviations from the ideal rotationally symmetrical shape to be expected periodically over a substantially rotationally symmetrical profile of the surface of the work piece. By simulation of the measurement process of the measurement of the coordinates, or at least parts of the measurement process, it is possible to determine a working position and/or a working orientation of the coordinate measuring instrument which allow/s the periodic shape deviations of the work piece from the ideal shape to be determined with low error. For example, the measurement task may require that the positions on the surface of the work piece for which the greatest shape deviations from the ideal shape are expected can be measured with an error that is less than a predetermined limit value. As an alternative, it is possible to determine that measurement orientation with respect to the turning device for which the periodic shape deviations can be measured with the least expected error of the turning device.

In particular, as described above, the at least one working position and/or working orientation may be determined by simulation of the coordinate measurement or machining of the work piece. The working position and/or working orientation is therefore determined optimally for the respective task.

In particular, the determination of the at least one working position and/or working orientation may be based on a measurement task, according to which the surface of the work piece is sampled in a scanning fashion. Scanning (for example tactile or optical) sampling of the work piece is often used for example to measure approximately rotationally symmetrical surface regions, and leads to measurement results in a short time.

The invention has the advantage that the measurement of the error of the turning device is simplified compared with full calibration, since expected errors are calculated from the measured errors. The measurement of the error of the turning device can therefore be repeated more often, for example each time before the measurement or machining of a work piece.

In particular, the at least one working position and/or working orientation determined from the expected error values of the turning device is output to a controller of the coordinate measuring instrument or of the machine tool by a determination instrument. It is possible for the determination instrument to be part of the controller. In this case, output takes place to a further part of the controller, which controls the measurement of the work piece by the coordinate measuring instrument or the machining of the work piece by the machine tool. In this way, measurement of the work piece or machining of the work piece can be begun automatically after the determination of the at least one working position and/or working orientation.

The coordinate measuring instrument is, for example, a probe for tactile sampling or optical sampling of the work piece. Alternatively, it is a sensor (for example a measurement head) which is configured, as a function of the measurement of the work piece, to generate signals from which the coordinates of the work piece can be determined. The coordinate measuring instrument is, for example, part of a coordinate measuring apparatus. The processing tool of the machine tool may, for example, be a cutting tool or a grinding tool.

The scope of the invention also includes a coordinate measuring apparatus comprising the arrangement for reducing the error of a turning device. In particular, the coordinate measuring apparatus the determination instrument may be connected to a controller of the coordinate measuring apparatus, so that the controller can control a measurement of coordinates of a work piece according to the at least one working position and/or working orientation of the coordinate measuring instrument which has been determined.

As already mentioned, the invention may be used in the field of machine tools. Often, machine tools comprise two turning devices (usually referred to as spindles). One spindle rotates the work piece during the machining. The other spindle allows the processing tool to be rotated. In many cases, the rotation axes of the two spindles are parallel to one another. By the invention, the tool spindle can be brought into a favorable rotational position (and therefore into a corresponding working orientation) and/or into a favorable working position along the rotation axis of the work piece spindle.

In particular, an error map or an error model may be generated from the expected error values of the turning device which have been determined. The map or the model may, for example, be stored in a data memory, to which the controller of the coordinate measuring apparatus or the machine tool has access. The difference between an error map and an error model is that, in the error map, the error values are stored for the respective working positions and/or working orientations, while an error model contains at least one calculation rule regarding how the expected error values can be calculated from information about the error values at desired working positions and/or working orientations. A combination of an error map and an error model is possible. For example, the error model may establish the way in which expected error values are determined from error values contained in the error map for other working positions and/or working orientations. In particular, the aforementioned further influences on the errors of the turning device, for example the weight of the work piece may also be taken into account by different error maps and/or error models respectively assigned to the influencing factor or a combination of influencing factors. Here again, a combination of error maps and error models is possible.

In particular, an error model may have information about the turning device (for example the stiffness of the bearing of the rotationally mobile part of the turning device) and, by using this information, calculate expected error values of the turning device for at least one working orientation and/or working position, which are to be expected for particular, in particular predetermined tasks. For example, the error model may in this way take into account the change in the working conditions due to forces acting during the machining of the work piece or the measurement of the work piece.

In particular, the controller of the coordinate measuring apparatus or of the machine tool may determine working orientations and/or working positions which are favorable with respect to the error of the turning device, and propose these to a user. As mentioned above, as an alternative or in addition, the controller may automatically use these favorable working positions and/or working orientations for the working process.

In the field of machine tools, the invention is suitable in particular for rapidly rotating turning devices, in particular work piece spindles, since in the case of high rotational speeds no compensation for the error of the turning device is possible, for example by corresponding tracking of the processing tool.

The invention is also suitable in combination with computational correction of the error of the turning device. For example, the turning device may have been calibrated and corresponding correction values for correcting the error of the turning device may be stored, for example for access by the controller of the coordinate measuring apparatus or of the machine tool. In this case, the method according to the invention may determine the expected residual errors for various working positions and/or working orientations while taking the corrections into account, and use these as described above as expected errors of the turning device.

Instead of computational correction of the errors of the turning device and computational determination of the expected residual errors, the measurement of the errors of the turning device may be carried out while taking the corrections into account, and the residual error may be measured in this way. The expected error values may in turn be determined therefrom.

BRIEF DESCRIPTION OF THE SEVERAL VIEWS OF THE DRAWINGS

Exemplary embodiments of the invention will now be described with reference to the appended drawing. In the individual figures of the drawing.

DESCRIPTION OF THE INVENTION

Figure 1:
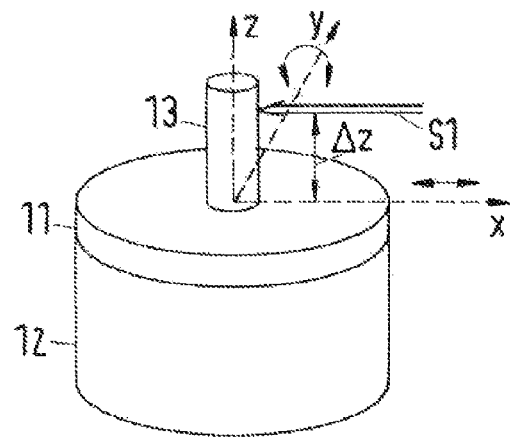
FIG. 1 shows a turning device, in particular a turntable, for a coordinate measuring apparatus, a rotationally symmetrical part, here a cylinder, the rotation axis of which coincides with the rotation axis of the turning device, being arranged on the rotatable part of the turning device, and a particular working position and working orientation, for example of a sensor of a coordinate measuring apparatus, being represented schematically.

The turning device represented in FIG. 1 comprises a rotatable part 11, which is rotatable relative to a non-rotatable part 12 of the turning device about an ideal rotation axis, which in the representation of FIG. 1 coincides with the z axis (for example the vertical axis) of a Cartesian coordinate system x, y, z. The actual rotation axis of the turning device 11, 12, however, deviates from the ideal rotation axis since the turning device is affected by error.

FIG. 1 shows a cylindrical part 13, which is arranged on the surface of the rotatable part 11 and the cylinder axis of which is oriented in the direction of the real rotation axis of the turning device 11, 12. For the considerations below, it is assumed that the cylindrical part 13 has no geometrical errors, i.e. it is an ideal cylinder. When a sensor or probe of a coordinate measuring apparatus, or similarly a processing tool of a machine tool, is oriented at the surface of the cylindrical part 13 in the direction represented by a double-line arrow s1, and when the rotatable part 11 of the turning device is rotated, and the cylindrical part 13 therefore rotates with it, the error of the turning device, i.e. the deviation of the real rotation axis from the ideal rotation axis, has an effect on the measurement or machining. As will be mentioned in more detail, the error has a different effect as a function of the working position and working orientation of the probe, sensor or tool. In the case represented in FIG. 1, the working position along the z axis of the coordinate system x, y, z is displaced upward by the amount Δz, and extends parallel to the x axis. As indicated by an arrow pointing in two directions along the x axis, the error of the turning device 11, 12 may displace the circumferential surface of the cylindrical part 13 along the x axis in both directions, i.e. during a full revolution of the rotatable part 11 the x position of the surface region of the part 13, at which the probe, sensor or tool is oriented, varies to and fro in the x direction.

Figure 2:
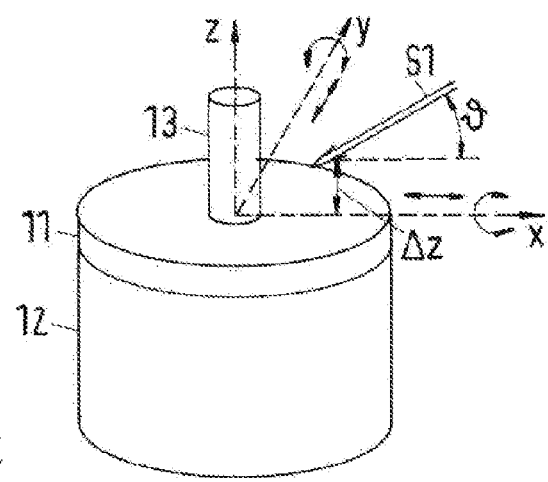
FIG. 2 shows the representation of FIG. 1, the working orientation and working position of the sensor being selected differently than in FIG. 1.

FIG. 2 shows the arrangement of FIG. 1, but with the working orientation changed. In the case represented, as in FIG. 1, the working position lies above the x,y plane (this plane is, for example, also the plane of the turntable surface) of the coordinate system by the amount Δz. The working orientation also extends perpendicularly to the z axis, but makes an angle θ with a parallel to the x axis. A corresponding plan view is represented in FIG. 3.

Both in FIG. 1 and in FIG. 2, it is indicated by curved-line arrows about the x axis and y axes, respectively, that the real rotation axis of the turning device may tilt (i.e. turn or rotate) about the x axis and the y axis while the rotatable part 11 is being rotated.

Figure 3:
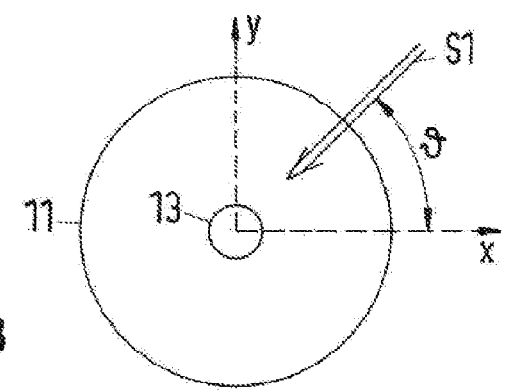
FIG. 3 shows a plan view of the arrangement in FIG. 2 to explain the angle the working orientation of the sensor makes with a coordinate axis.
Figure 4:
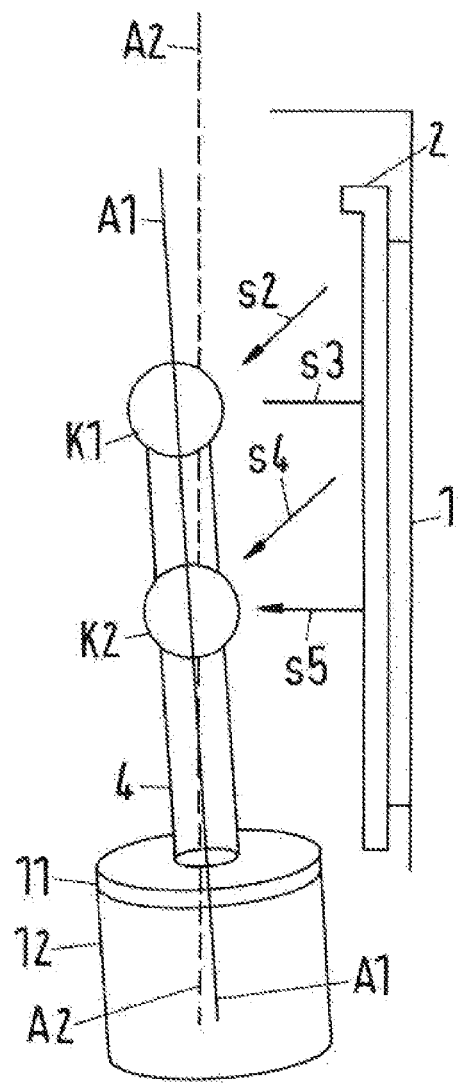
FIG. 4 shows an arrangement comprising a turning device, in particular the turning device according to FIG. 1 to FIG. 3, a calibration body which comprises two rotationally symmetrical measurement bodies being combined with the turning device in order to measure tilts and displacements of the real rotation axis of the turning device relative to the ideal rotation axis of the turning device.

The measurement of the error of a turning device, in particular the turning device according to FIG. 1 to FIG. 3, is represented in FIG. 4. The measuring arrangement comprises four measurement sensors, the measurement directions of which are represented by arrows, which are denoted by the references s2, s3, s4, s5. The measurement sensors are not represented in detail, and may for example be fastened on a common holder 2, which is arranged on a stationary instrument 1. The representation in FIG. 4 is to be interpreted as being schematic. In practice, different mechanical configurations of the arrangement are possible.

The measurement sensors with the measurement directions s2, s3 are oriented at a first spherical region K1 of a calibration body 4. The measurement sensors with the measurement directions s4, s5 are oriented at a second spherical region K2 of the calibration body 4. The spherical regions K1, K2 are arranged at different axial positions along the real rotation axis A1 of the turning device 11, 12. From FIG. 4, it can be seen that the real rotation axis A1 extends at an inclination relative to the ideal rotation axis A2, or extends askew thereto.

The calibration body 4 in the exemplary embodiment of FIG. 4 is a rod, which extends with its longitudinal axis in the direction of the real rotation axis A1 while comprising the aforementioned spherical regions K1, K2. The centers of the spherical regions K1, K2 lie on the real rotation axis A1. Alternative calibration bodies are possible. For example, a cylindrical body, for example the cylindrical body 13 of FIG. 1 to FIG. 3, may be used as a calibration body, and the sensors may respectively be oriented pairwise at different height positions (or z positions). Preferably, the sensors are respectively oriented pairwise perpendicularly to one another. This is not absolutely necessary, however, but it does facilitate the evaluation of the measurement. Furthermore, it is preferred for the measurement directions of all four measurement sensors to be oriented perpendicularly to the ideal rotation axis A2. Optionally, a further measurement sensor, which measures the z position of the upper part of the calibration body (i.e. in FIG. 4 the first spherical region K1), may also be used in addition.

In various rotational positions of the rotatable part 11 relative to the fixed part 12 of the turning device, for example at angular intervals of respectively 1°, the distance to the spherical regions K1, K1 and/or the position of the spherical region K1, K1, or the surface thereof, is then respectively measured in the measurement directions s2-s5. In this way, the x and y components of the overall error of the turning device at two different z positions are measured by the four measurement sensors. The translational error and the rotational error of the turning device can be determined therefrom. The translational error is defined in that it has the same effect over the entire range of possible working positions (or the entire height, here in the z direction), but depends on the rotational position of the rotatable part. Conversely, the rotational error has a different effect over the entire range of possible working positions. This will be discussed in more detail with the aid of FIG. 5. Both the rotational error and the translational error depend in general on the rotational position of the rotatable part 11. It follows from this that it is not possible to distinguish between the translational and rotational errors of the turning device with a single measurement sensor or in a fixed working orientation. Conversely, it follows from this that there are working orientations and working positions for which the translational and rotational errors are compensated for better (in terms of low error values) than for other working positions and working orientations. This will be discussed in more detail.

Furthermore, in the present case it is assumed that the eccentricity and the tilt of the calibration body, as well as of the work piece, can be taken into account and corrected separately. An ideal rotationally symmetrical calibration body is therefore furthermore assumed.

Figure 5:
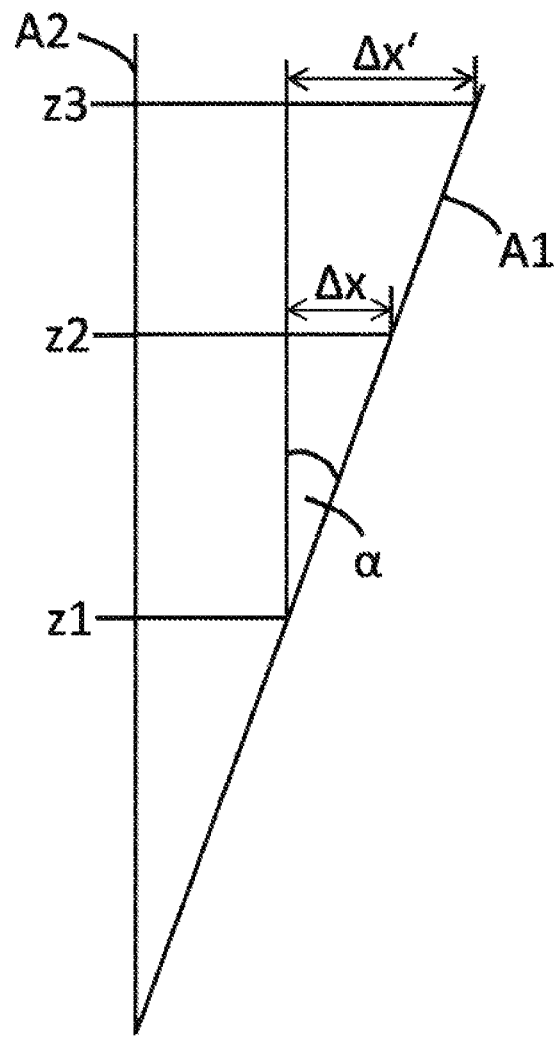
FIG. 5 shows a schematic representation of geometrical relationships of the real and ideal rotation axes of a turning device, for example the turning device according to one of FIGS. 1 to 4.

From the obtained measurement values of the error of the turning device, for example, in a first step it is possible to calculate the measurement errors which there were at z positions other than in the measurement. For example, the measurements were carried out as described with the aid of FIG. 4 at the lower two z positions z1, z2 represented in FIG. 5. FIG. 5 shows a representation in the x, z plane of the coordinate system x, y, z. The real rotation axis A1, or the projection thereof onto the x, z plane, is inclined relative to the ideal rotation axis A2 buy the angle α. Correspondingly, at the position z1, for example, a smaller deviation from the ideal situation (which exists when the rotational movement takes place about the ideal rotation axis) is established than at the position z2. The difference in the error at the z positions z1, z2 is Δx. From this, for a third z position z3, it is possible to calculate the deviation in the x direction from the ideal situation, as indicated in FIG. 5. In the z position z3, the deviation Δx' from the ideal position is more than at the z position z1. In this way, both the deviations in the x direction, as well as in a similar way the y direction, can be calculated for the entire relevant range in the z direction, specifically according to the following equation for the deviation in the x direction:

$$x2 = x1 - \sin(\alpha)*(z1-z2)$$

In the formula, x1, x2 denote the positions in the x direction of the real rotation axis A1, or the projection thereof into the x, z plane, z1, z2 denote the z positions and a denotes the angle represented in FIG. 5 between the real rotation axis A1 and the ideal rotation axis A2. The equation is not, however, valid only for the two z positions of the error measurements, but also respectively for any two other z positions, including a measurement position and a position to be calculated. The calculation of the y positions is carried out in the same way, by replacing x2 with y2 and x1 with y1 in the equation, and considering the projection of the real rotation axis A1 onto the y,z plane. Furthermore, the angle α is replaced with a corresponding inclination angle, which describes the tilt in the y,z plane.

Figure 6:
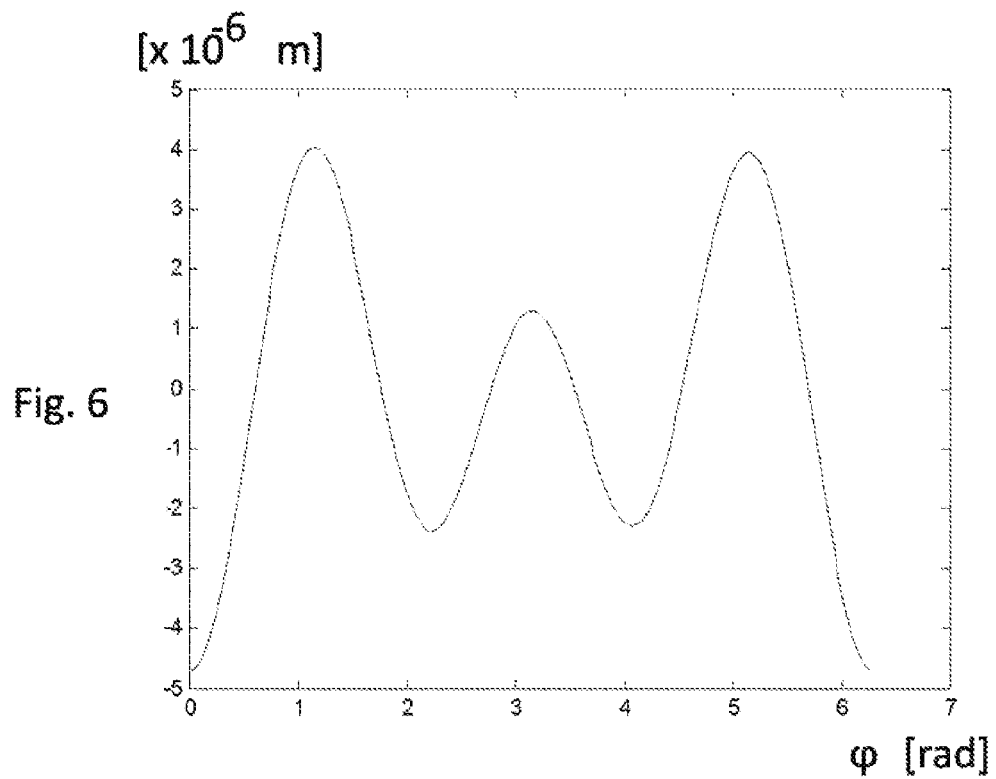
FIG. 6 shows a diagram which represents the translational error of a rotation axis with respect to a coordinate axis (for example the x axis), which extends perpendicularly to the rotation axis of the turning device and is part of a static coordinate system, as a function of the rotation angle of the rotatable part of the turning device relative to the fixed part of the turning device.

In FIG. 6, for example, only the translational error of a turning device in the x direction is represented as a function of the rotational position of the rotatable part (for example of the part 11 in FIG. 1 to FIG. 4). The translational error is obtained, as mentioned, from the measured overall error, by determining as the translational error the component of the overall error which is the same for all z positions at the respective rotational position.

As shown by FIG. 6, the translational error in the x direction varies in the course of the rotation of the rotatable part. A full revolution is represented, as can also be seen from the scaling on the horizontal axis. Along the vertical axis, the translational error components in the x direction are represented here in a range of between about $-5 \times 10^{-6}$ m to $+5 \times 10^{-6}$ m.

Figure 7:
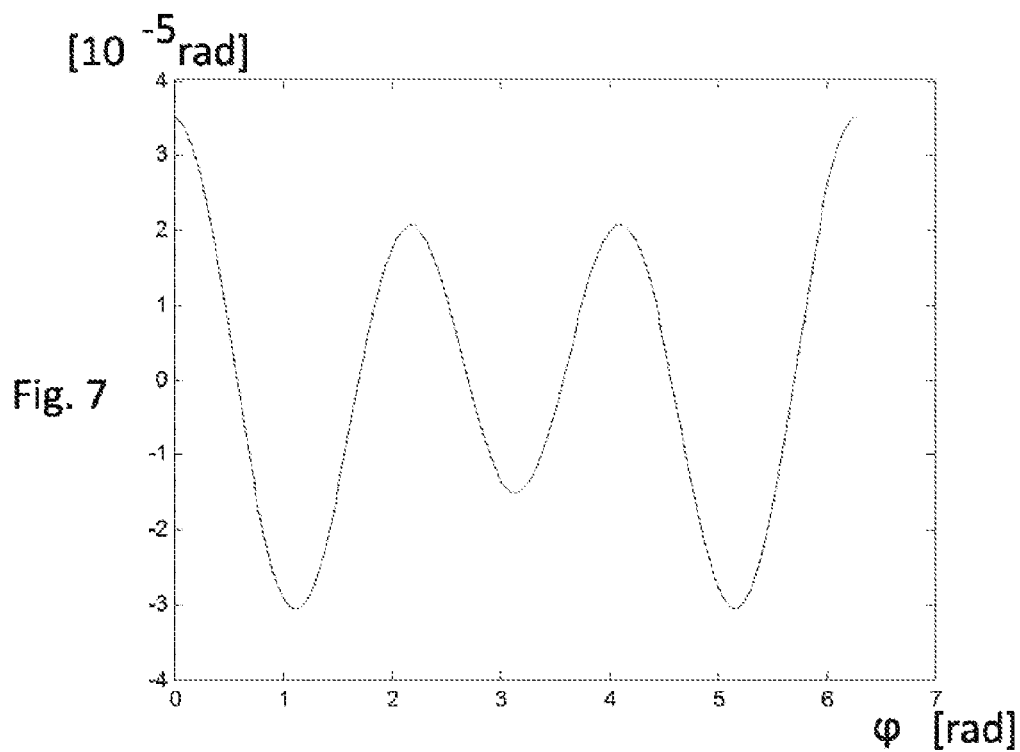
FIG. 7 shows a diagram which shows the inclination error (tilt angle) of the real rotation axis of a turning device relative to the ideal rotation axis of the turning device as a function of the rotation angle of the rotatable part relative to the fixed part of the turning device, only a tilt about the coordinate axis (for example the y axis) which extends perpendicularly to the coordinate axis (for example the x axis), with respect to which the translational error is represented in FIG. 6, being considered, i.e. the errors according to the representations in FIG. 6 and FIG. 7 may reinforce or compensate for one another.

The corresponding rotational error, which has an effect in the x direction (i.e. which is for example attributable to a tilt of the real rotation axis A1 only about the y axis) is represented in FIG. 7.

As already mentioned above, the translational error does not have a differing effect within the possible range of z values. The rotational error, on the other hand, does vary in the range of possible z values. The overall error, which is composed of the translational and rotational errors, therefore also varies as a function of the z position. If the working orientation can be described merely by the z position, for example because the working orientation is always directed perpendicularly to the ideal rotation axis, the overall error represented in FIG. 8 as a function of the z, i.e. as a function of the working position which can be described uniquely by the z position is obtained from the translational and rotational errors represented in FIG. 6 and FIG. 7. The overall error is in this case specified as the difference between the maximum value and the minimum value of the error over a full revolution of the rotatable part.

Figure 8:
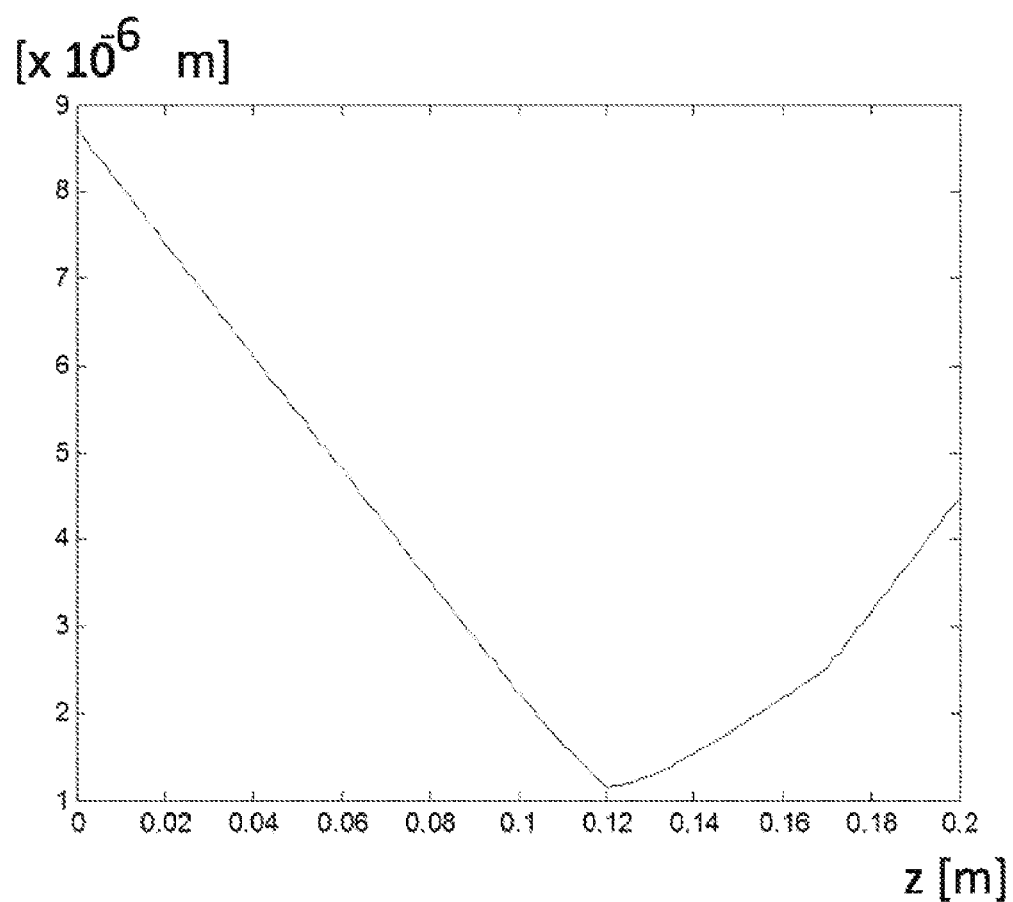
FIG. 8 shows a representation which represents the resulting error of the translational error represented in FIG. 6 and of the rotational error represented in FIG. 7 for a full revolution of the turning device, as a function of the working position along the rotation axis.

It can be seen in FIG. 8 that, in a range of possible z positions between 0 and 0.2 m, the overall error lies between values of about $1 \times 10^{-6}$ m and $9 \times 10^{-6}$ m, and has its minimum at about z=0.12 m. When, therefore, only the errors represented in FIG. 6 and FIG. 7 occur (i.e. no errors which have an effect in the y direction), or when the working orientation is directed parallel to the x axis of the coordinate system, the recommendation is to select the working position at the height, or z position, of 0.12 m. With this working position and the aforementioned working orientation, the error of the turning devices is minimal.

The case described above, in which merely errors in the x direction were considered, is now extended to the general case in which errors can also occur in the x direction, or the working orientation does not always extend parallel to the x direction.

Figure 9:
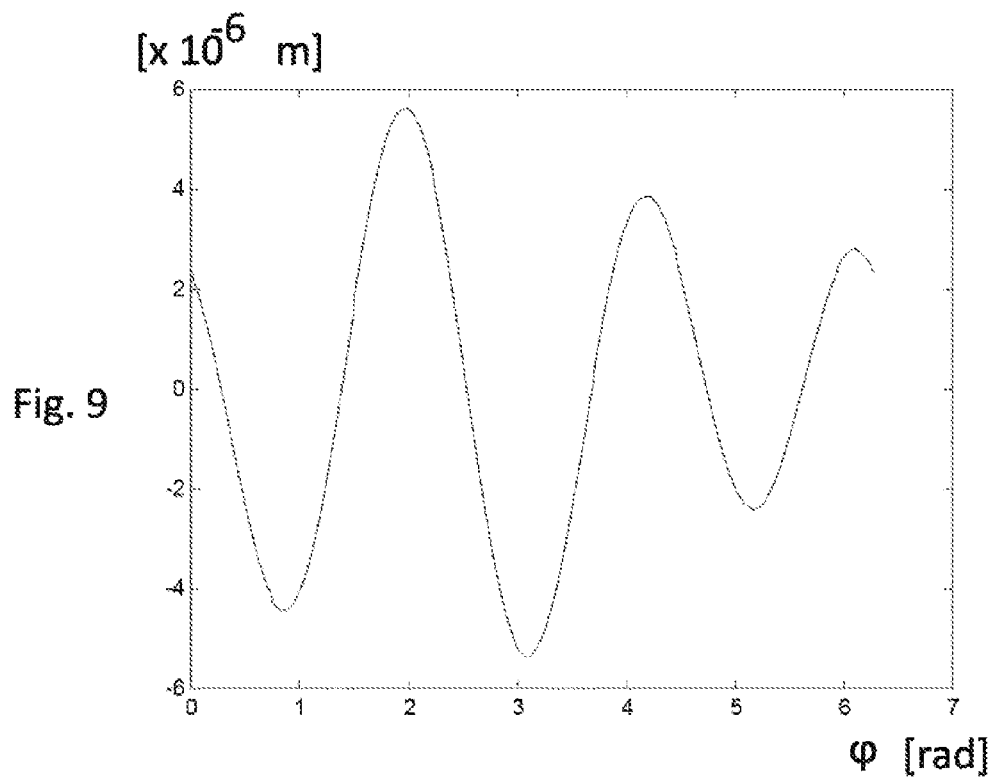
FIG. 9 shows a diagram which shows the translational error of a turning device in a similar way as in FIG. 6, but with respect to a second coordinate axis extending perpendicularly both to the rotation axis and to the first coordinate axes, as a function of the rotational position of the rotationally mobile part.
Figure 10:
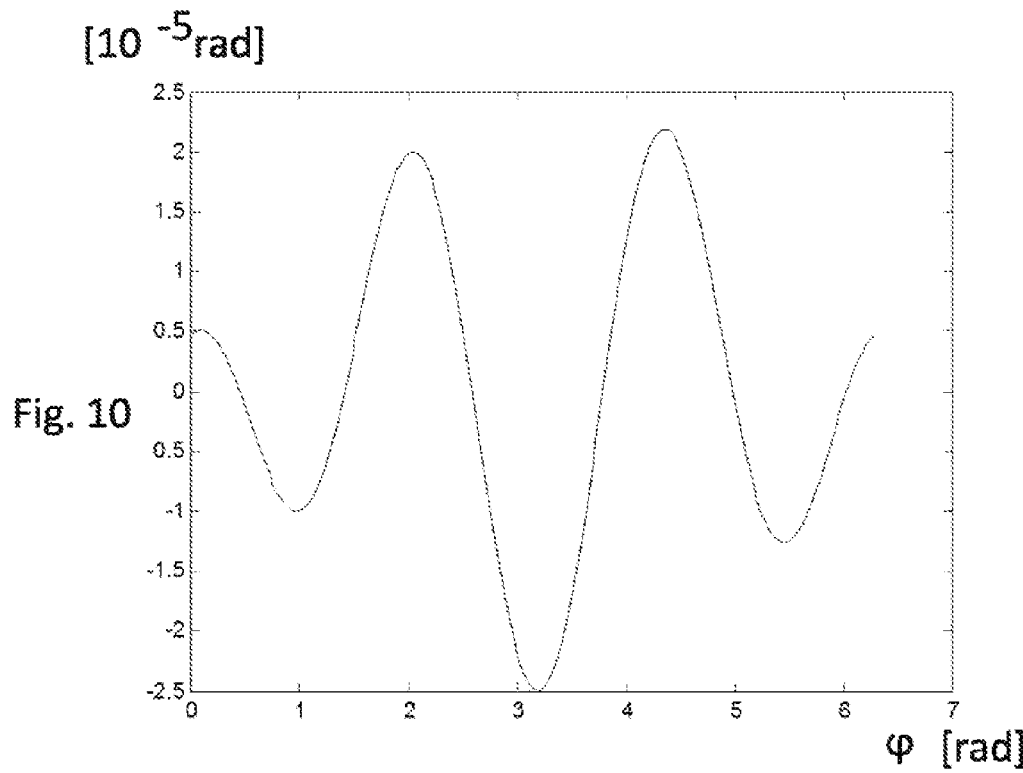
FIG. 10 shows a diagram which, corresponding to FIG. 7, shows the rotational error which may reinforce or compensate for the translational error represented in FIG. 9.
Figure 11:
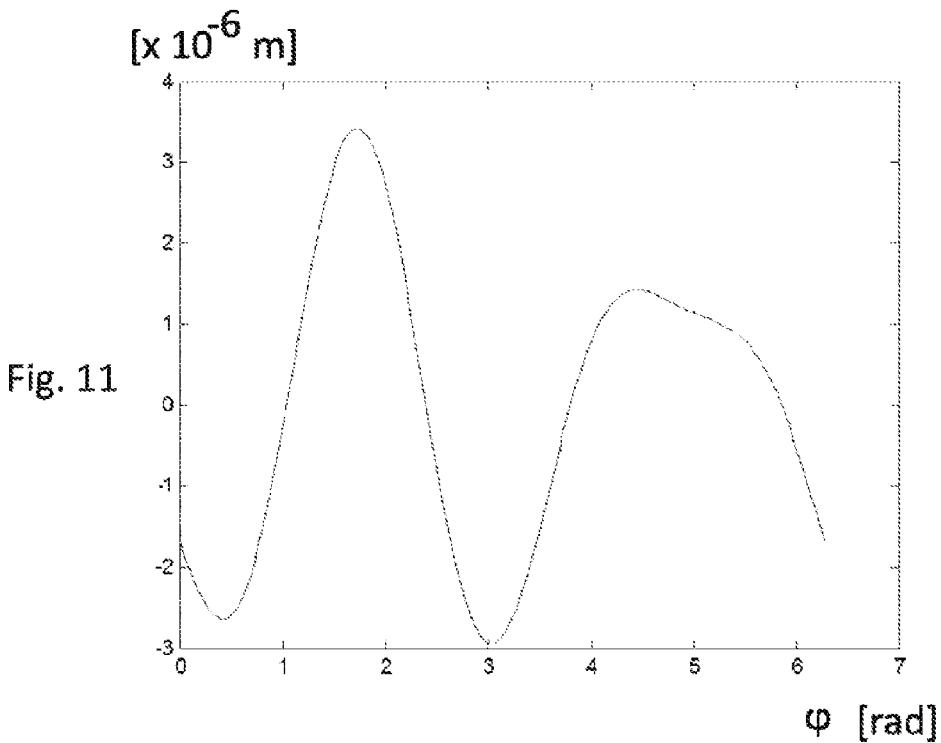
FIG. 11 shows the translational error for a particular working orientation on the basis of the measured translational error represented in FIG. 6 and FIG. 9, as a function of the rotational position of the rotatable part of the turning device.

FIG. 9 and FIG. 10 show the dependencies, corresponding to FIG. 6 and FIG. 7, of the translational error (FIG. 9) and of the rotational error (FIG. 10), which act in the y direction. In FIG. 11, the overall translational error (i.e. the overall error of the errors represented in FIG. 6 and FIG. 9) is represented for a particular working orientation. This overall error can be calculated from the error $s_x$, which acts in the x direction, and the error $s_y$, which acts in the y direction, by the following equation:

$$s(\phi,\vartheta)=s_x(\phi)\cdot\cos(\vartheta)+s_y(\phi)\cdot\sin(\vartheta)$$

Here, $\vartheta$ denotes the angle of the working orientation, introduced with the aid of FIG. 2 and FIG. 3, and $\phi$ denotes the rotation angle of the rotatable part of the turning device, which is also plotted along the horizontal axis in the diagrams of FIG. 6, FIG. 7, FIG. 9 and FIG. 10, and in further diagrams.

By comparing FIG. 11 with FIG. 6 and FIG. 9, it can be seen that the error components in the x direction and the y direction partially compensate for one another. In FIG. 11, the error values lie in a smaller range than in FIG. 6 and FIG. 9. This, however, depends on the selected working orientation, i.e. for example the orientation of the probe, sensor or tool relative to the turning device. The working orientation has been selected at $\vartheta=45°$.

The overall rotational error, which like the overall translational error depends on the working orientation, i.e. the angle $\vartheta$, and also depends on the working position, i.e. the position in the z direction, can be calculated in a corresponding way.

Figure 12:
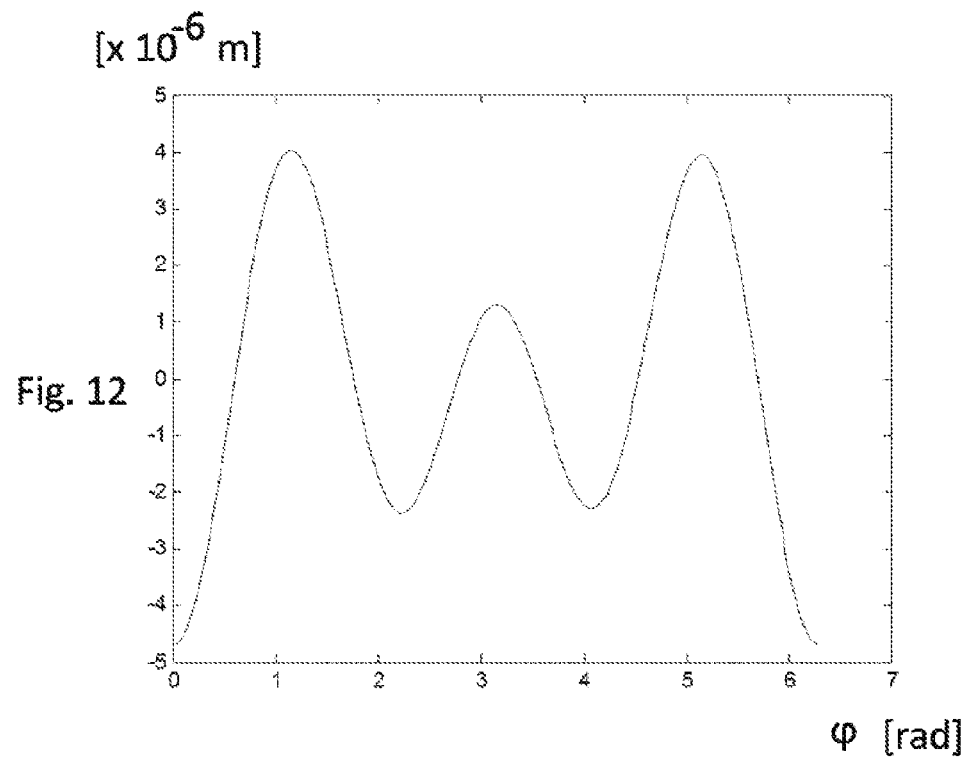
FIG. 12 shows the overall error of the turning device, for example taking into account the translational errors and the rotational errors, for a first working orientation and a first working position, as a function of the rotational position of the rotatable part.
Figure 13:
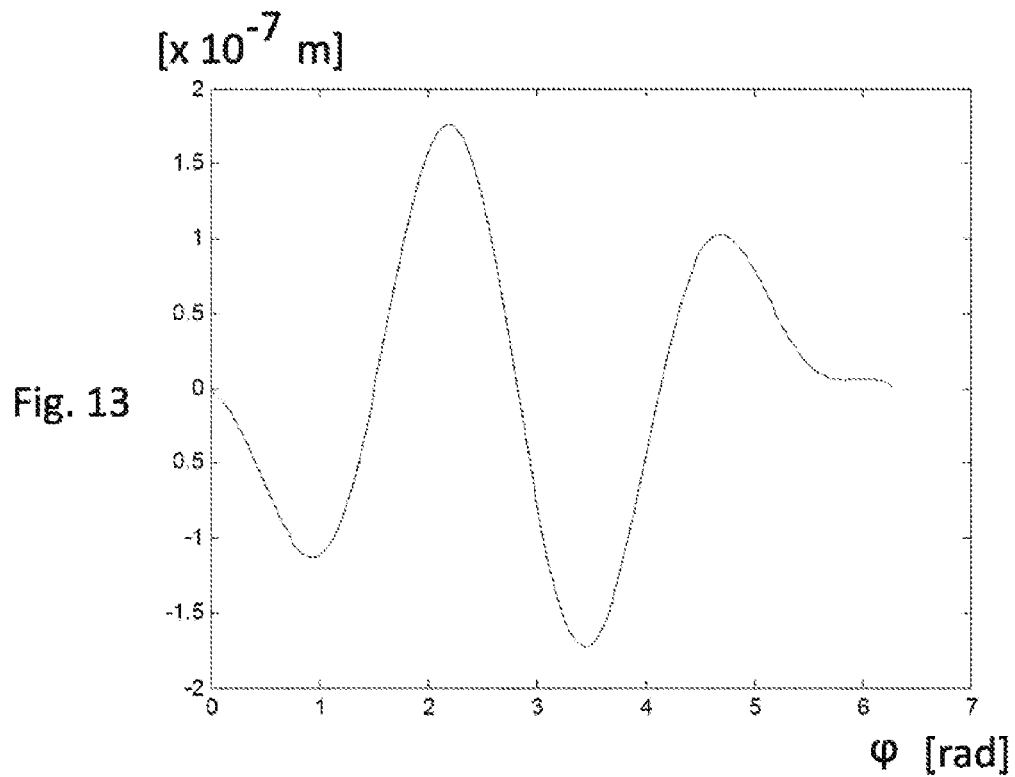
FIG. 13 shows the overall error of the turning device for a second working orientation and a second working position, as a function of the rotational position of the rotatable part.
Figure 14:
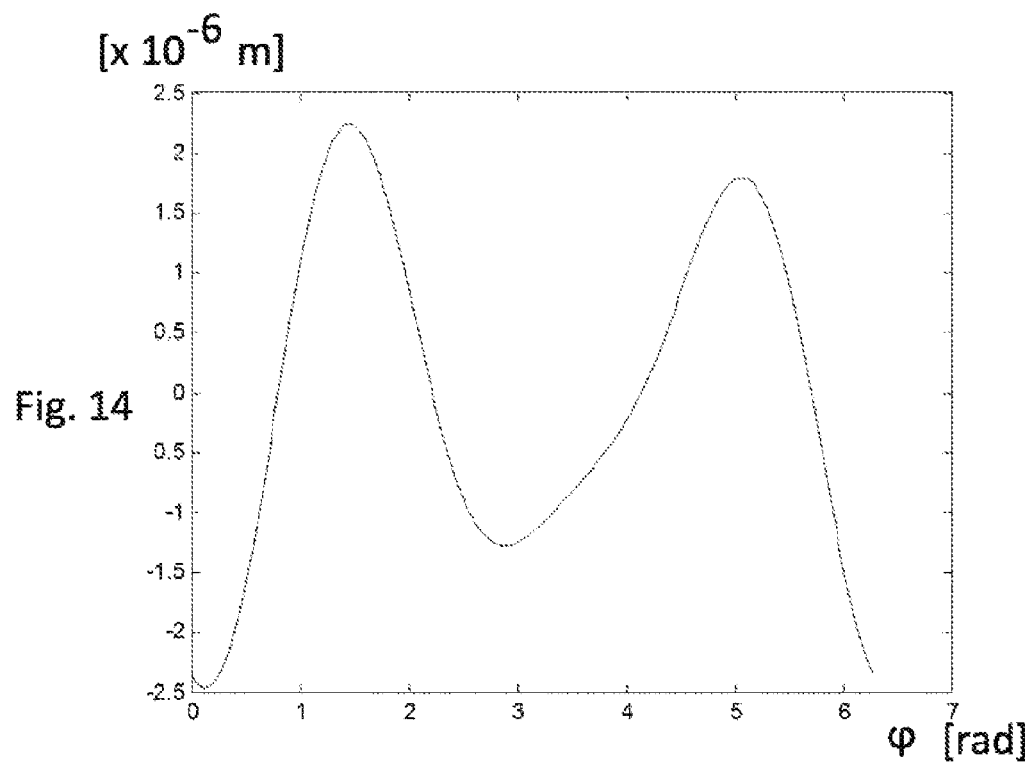
FIG. 14 shows the overall error for a third working orientation and a third working position, as a function of the rotational angle of the rotatable part, and FIG. 15 schematically shows an arrangement comprising a turning device, a measuring arrangement, a prognosis instrument, a determination instrument and a controller of a coordinate measuring apparatus or of a machine tool.

FIGS. 12 to 14 therefore represent the dependencies of the overall error of the translational errors in the x direction and the y direction, as well as the rotation in the x direction and the y direction, merely for three selected pairs of working position and working orientation. Since the overall rotational error depends both on the working orientation and on the working position, this also applies for the overall error for rotation and translation.

The working position for the representation in FIG. 12 is 0 in this example. The working orientation is likewise 0. The overall error varies in a range of 8.7 µm. In the case of FIG. 13, the working position is z=0.144 m. The working orientation is $\vartheta=3.3$ rad. The values of the overall error vary over one revolution of the rotatable part of the turning device in a range of 0.35 µm. For the result in FIG. 14, the working position is z=0.047 m and the working orientation is $\vartheta=0.34$ rad. The error values vary in a range of 4.7 µm.

The working position and working orientation belonging to the diagram in FIG. 13 therefore lead to the smallest errors for one revolution of the rotatable part, and were therefore to be recommended in comparison of the three possible pairs of working position and working orientation.

The recommendation need not be made in all cases while taking a full revolution of the rotatable part into account. Rather, measurement tasks or machining tasks may also be envisioned, according to which the rotatable part can be rotated merely over a subrange of one revolution. Different recommendations for working position and working orientation may therefore be obtained than for a full revolution.

Figure 15:
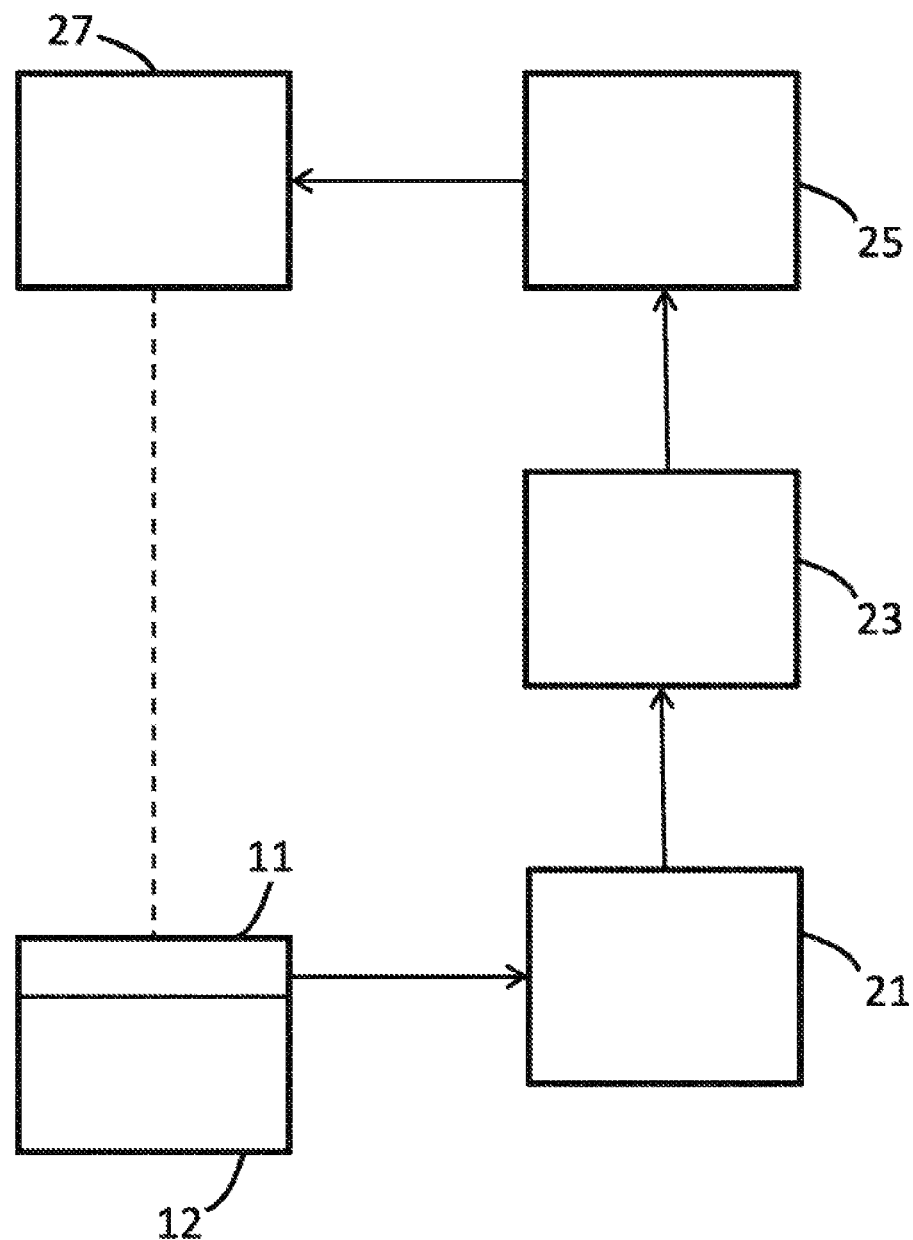

FIG. 15 schematically shows an arrangement comprising a turning device, for example the turning device according to FIG. 1 to FIG. 4. A rotatable part 11 of the turning device can be rotated relative to a non-rotatable part 12. The measuring arrangement 21 is configured in order to measure errors of the turning device 11, 12 and to deliver corresponding error measurement values to a prognosis instrument 23. This prognosis instrument 23 is configured in order to determine, from the error measurement values, expected error values of the turning device 11, 12 which are respectively expected for a relative working position and working orientation of a coordinate measuring instrument for determining the coordinates of the work piece (not represented in FIG. 15) or of a processing tool of a machine tool for machining the work piece, on the one hand, and the turning device, on the other hand. A determination instrument 25 is connected to the prognosis instrument 23, and is configured in order to determine, from the expected error values of the turning device 11, 12, at least one working position and/or working orientation for which the expected error value of the turning device 11, 12 is favorable. The at least one working position and/or working orientation determined by the determination instrument 25 is delivered to a controller 27 of the coordinate measuring apparatus or to the machine tool, which in particular automatically controls the measurement of a work piece or the machining of a work piece with the at least one working position and/or working orientation which has been determined.

The invention claimed is:

1. A method for reducing errors of a turning device in connection with a determination of coordinates of a work piece or with machining of the work piece, the turning device allowing a rotational movement of the work piece about a rotation axis of the turning device during the determination of the coordinates or during the machining of the work piece, which comprises the following steps of:

measuring errors of the turning device due to differences between actual positions and ideal positions of the rotation axis and due to differences between actual orientations and ideal orientations of the rotation axis in a range of rotation angles, namely in different rotational positions of two parts of the turning device being moved in rotation relative to one another about the rotation axis, and corresponding error measurement values are obtained;

determining expected error values of the turning device which are respectively expected for a relative working position and a working orientation of a coordinate measuring instrument for determining the coordinates of the work piece or of a processing tool of a machine tool for machining the work piece on the one hand, and the turning device on the other hand from the error measurement values; and determining from the expected error values of the turning device at least one working position and/or working orientation of the coordinate measuring instrument or of the processing tool, for which the expected error value of the turning device, under consideration of a predetermined measurement task for determining coordinates of the work piece or a predetermined machining task for machining the work piece is less than for other working positions and/or working orientations and/or satisfies a predetermined condition.

2. The method according to claim 1, which further comprises outputting, the at least one working position and/or the working orientation determined from the expected error values, to a controller of the coordinate measuring instrument or of the machine tool.

3. The method according to claim 1, which further comprises determining the at least one working position and/or the working orientation by simulation of coordinate measurement or machining of the work piece.

4. The method according to claim 1, which further comprises basing the determination of the at least one working position and/or the working orientation on a measurement task, according to which a surface of the work piece is sampled in a scanning fashion.

5. The method according to claim 1, which further comprises controlling a measurement of the coordinates of the work piece or machining of the work piece according to the at least one working position and/or the working orientation which has been determined.

6. A configuration for reducing errors of a turning device in connection with a determination of coordinates of a work piece or with a machining of the work piece, wherein the turning device allows a rotational movement of the work piece about a rotation axis of the turning device during the determination of the coordinates or during the machining of the work piece, the configuration comprising:

a measuring arrangement for measuring errors of the turning device due to differences between actual positions and ideal positions of the rotation axis and due to differences between actual orientations and ideal orientations of the rotation axis, in a range of rotation angles, namely in different rotational positions of two parts of the turning device being moved in rotation relative to one another about the rotation axis, and to output corresponding error measurement values;

a prognosis instrument receiving the error measurement values, said prognosis instrument determining expected error values which are respectively expected for a relative working position and working orientation of a coordinate measuring instrument for determining the coordinates of the work piece or of a processing tool of a machine tool for machining the work piece on the one hand, and the turning device on the other hand, from the error measurement values; and a determination device for determining from the expected error values of the turning device at least one working position and/or working orientation of the coordinate measuring instrument or of the processing tool, for which the expected error value of the turning device, under consideration of a predetermined measurement task for determining coordinates of the work piece or a predetermined machining task for machining the work piece is less than for other working positions and/or working orientations and/or satisfies a predetermined condition.

7. A coordinate measuring apparatus, comprising: the configuration according to claim 6.

8. The coordinate measuring apparatus according to claim 7, further comprising a controller, said determination device is connected to said controller, so that said controller can control a measurement of the coordinates of the work piece according to the at least one working position and/or the working orientation of the coordinate measuring instrument which has been determined.

* * * * *